United States Patent [19]

Caouette et al.

[11] 4,161,650
[45] Jul. 17, 1979

[54] SELF-POWERED FIBER OPTIC INTERCONNECT SYSTEM

[75] Inventors: Kenneth O. Caouette, Valencia; George H. Fortescue, Granada Hills; Mohammad K. Zaman, Northridge; Donald J. Oda, Palmdale, all of Calif.

[73] Assignee: Lockheed Aircraft Corporation, Burbank, Calif.

[21] Appl. No.: 894,161

[22] Filed: Apr. 6, 1978

[51] Int. Cl.² .................. H04B 9/00; H02M 3/24; G02B 5/14
[52] U.S. Cl. ................ 250/199; 307/DIG. 1; 307/150; 307/151; 350/96.15; 350/96.16; 358/901; 363/15
[58] Field of Search ............... 250/199; 358/901; 350/96.15, 96.16; 307/DIG. 1, 150, 151; 363/15, 17, 178

[56] References Cited

U.S. PATENT DOCUMENTS

| | | | |
|---|---|---|---|
| 2,629,802 | 2/1953 | Pantchechnikoff | 250/212 |
| 3,218,462 | 11/1965 | Raub | 307/215 |
| 3,222,535 | 12/1965 | Engelhardt | 250/212 |
| 3,473,036 | 10/1969 | Marcus | 250/210 |
| 3,657,543 | 4/1972 | Rose | 250/199 |
| 3,705,986 | 12/1972 | Sanders | 250/199 |
| 3,801,819 | 4/1974 | Ohnsorge | 250/199 |
| 3,809,908 | 5/1974 | Clanton | 250/199 |
| 3,838,412 | 9/1974 | Jones | 250/199 |
| 3,952,265 | 4/1976 | Hunsperger | 350/96.15 |
| 4,041,364 | 8/1977 | Gauper | 307/150 |

Primary Examiner—Howard W. Britton
Attorney, Agent, or Firm—Ralph M. Flygare

[57] ABSTRACT

A self-powered fiber optic interconnect system in which electrical output from data transmitting equipment is converted in a transmitter unit to optical signals in a fiber optic cable for transmission to a receiver unit for reconversion to electrical signals for data receiving equipment and a power source separate from the transmitting and receiving equipment so that the interconnect system can be completely interchangeable with an electrical copper wire interconnect system. When the data transmitting equipment is a computer with parallel data output, the transmitter unit converts the parallel output to serial data output for transmission to the receiver unit over a single fiber optic cable and the receiver unit reconverts the output to parallel data for the data receiving equipment.

8 Claims, 7 Drawing Figures

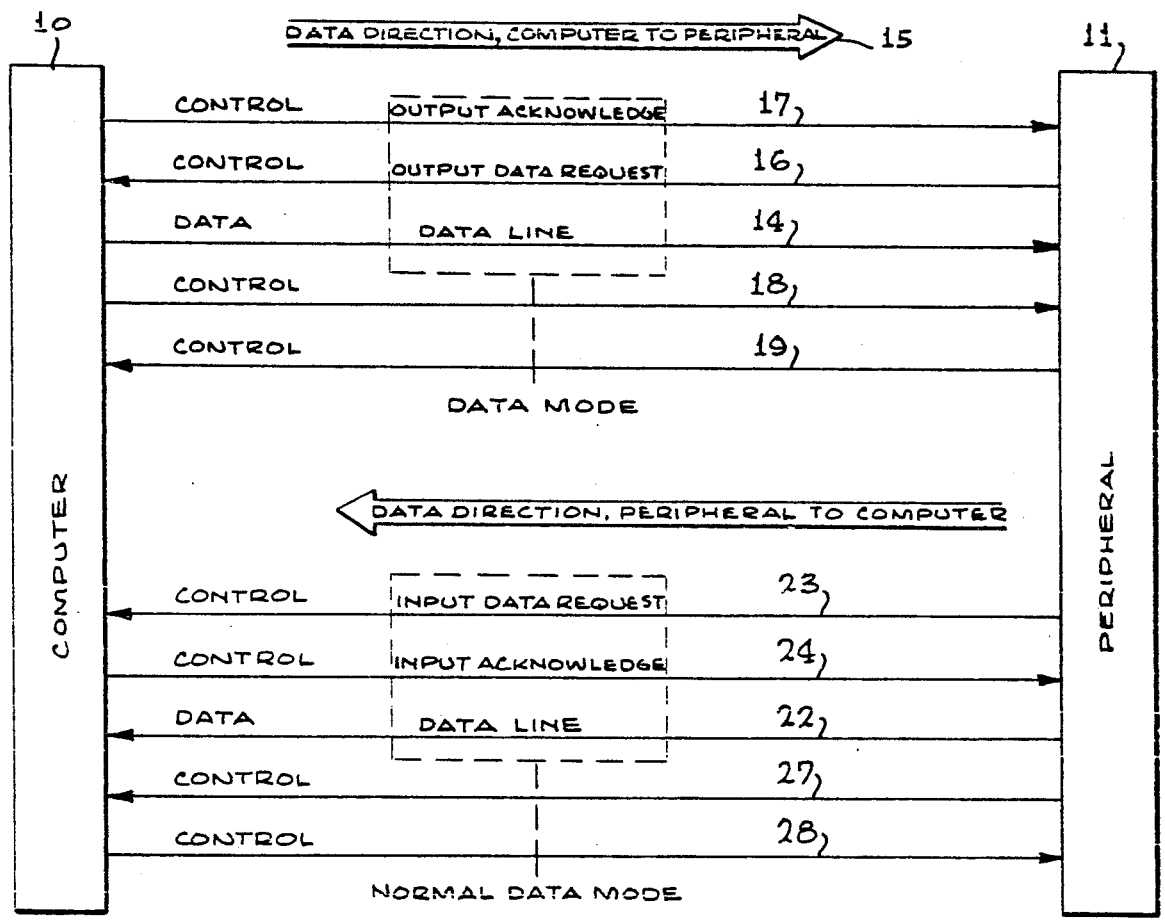
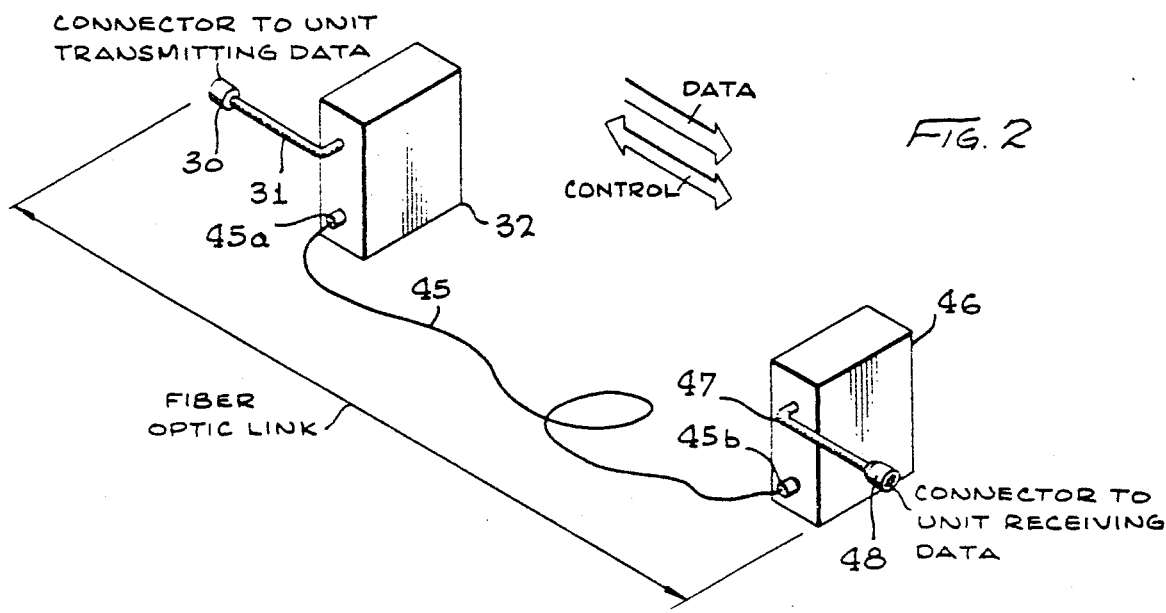

SELF-POWERED FIBER OPTIC INTERCONNECT SYSTEM

BACKGROUND OF THE INVENTION

Present computer input/output communication is achieved using parallel data transfer over multiwired twisted pair cables. This type of interconnect system requires large multi-pin connectors and bulky cables. Numerous difficulties have been experienced with such interconnect systems. For instance, such electrical systems are susceptible to electromagnetic and electrostatic fields and the data transmission is not secure against detection. Also, the failure of the electrical cables cause an arcing and present a fire hazard and the system must be electrically isolated with impedance matching. In aircraft, the electrical interconnect systems are very bulky and are susceptible to electromagnetic cross-talk and interference (EMI). One factor which causes such systems to be bulky is the parallel word structure of the airborne digital computer. This bulkiness can be reduced by serial type interfaced word structure for the data processing system which greatly reduces the number of wires required for the interconnect system. Fewer wires decreases the transmission medium weight. However, even the serial type word structure using an electrical interconnect system presents problems of security, interference from electromagnetic and electrostatic fields, arcing, etc. In a typical aircraft computer, the communication from the computer to the peripheral consists of thirty bit parallel input data or command words with a complement of four input/output control signals. The same communication is required from the peripheral to the computer. While such a computer system will hereinafter be referred to for explanation purposes, it is understood that the number of bits and control signals can vary with the construction of the computer and peripheral.

The employment of fiber optic interconnect systems has been suggested for various applications. An optical link for illuminated travelling message display sign system is disclosed in U.S. Pat. No. 3,838,412 to Clifford M. Jones and John D. Harnden, Jr., granted Sept. 24, 1974. This patent discloses a multiplex method in combination with an optical link for serialized data transmission. More particularly, Jones et al discloses an optical data link comprising an optical transmitter in the form of a light emitting diode (LED), an optical receiver in the form of an optical detector, and parallel-to-serial and serial-to-parallel conversion in the transmitter and receiver stations. A basic electro-optical transmission line is disclosed in the U.S. patent to John F. Clanton, U.S. Pat. No. 3,809,908, granted May 7, 1974. This patent relates to an electrical-optical transmission line having a light emitting diode on the transmitting end and a photo-sensitive device such as an infrared photo diode on the receiving end. U.S. Pat. No. 3,473,036 to Thomas J. Marcus discloses a code matrix reader comprising an array of photovoltaic cells which emit electrical signals when they are exposed to light energy. Other U.S. patents of interest consist of Ohnsorge U.S. Pat. No. 3,801,819, Sanders U.S. Pat. No. 3,705,986, Rose U.S. Pat. No. 3,657,543, Englehardt U.S. Pat. No. 3,222,535, Raub U.S. Pat. No. 3,218,462, Puntchechnikoff U.S. Pat. No. 2,629,802, and Hunsperger U.S. Pat. No. 3,952,265. None of the interconnect systems of the prior art disclose a self-powered capability starting with digital signal levels and producing from this signal level both positive and negative voltages with enough power to operate a plurality of integrated circuits plus drive a plurality of LEDs and photo diodes with associated amplifiers.

SUMMARY OF THE INVENTION

The present invention provides a fiber optic data interconnect system which can replace an electrical interconnect system without any substantial modification of the equipment at each end of the system. In the case of a computer using parallel data transfer over multi-wire, twisted pair cables, the system converts the parallel data to a serial data stream for transmission over a single fiber optic line. In a typical aircraft computer, one fiber optic cable can carry serial information obtained from thirty parallel input data lines and a second cable can transmit clock information for reconstruction of the data in parallel form at the receiving end of the link. This fiber optic interconnect system is self-contained and is provided with a power unit which derives power from the computer data lines without modification of the existing computer and peripheral equipment. Thus, the present invention eliminates the large multi-pin connectors and bulky cables required for some prior electrical interconnect systems and reduces the size and weight of the interconnect systems by the use of fiber optic cables.

The system consists basically of the transmitter-converter, fiber optic channel, and the receiver-converter with power units, interface circuitry, and system delays for compability of the input/output characteristics of the computer peripheral equipment. For purposes of illustration, the transmitter accepts thirty parallel data bit inputs from the interfacing circuitry and converts them to a nonreturn to zero (NRZ) serial data stream which drives the optical light source connected with the fiber optic line. The receiver-circuitry on the other end of the fiber optic line accepts the optical serial signal and translates it to an electrical serial information stream which is then assembled into a thirty bit parallel output.

The system utilizes light emitting diodes (LEDs) as the light energy source and photo diode detectors followed by amplifiers for conversion of the information to proper logic levels. The typical interconnect system employs multiple twisted wire pairs for computer output so that the fiber optic interconnect system has the previously referred to advantage of reduced EMI, ground loops, ringing and arcing, and improves security and reliability. With the operating power derived from the computer impulses, the fiber optical interconnect system of the present invention is particularly adapted for use as a direct replacement cable assembly with all conversion and multiplexing electronics contained within existing style or customized backshells.

The self-powered interconnect of the present invention eliminates the need for external power wiring and makes possible a plug-in interchangeability between fiber optic and electrical cable links. However, the weight advantage of the fiber optic link would be less in the event a serial output computer is utilized since a single electrical wire could carry the serial information from the computer to the peripheral. However, the other advantages to the fiber optic system would still exist, the most important of which relative to aircraft onboard computers is that the fiber optic link is immune to electromagnetic interference (EMI). Also, the fiber optic bundles do not tend towards catastrophic failures as do wire interconnects when shorts or opens occur. Closer physical spacing of information carrying fiber optical cables and positioning of these cables near high power system, such as radar, is possible. Also, increased electromagnetic security is achieved by the elimination of radio frequency emissions. Finally, there can be one standard type of information carrying optical fiber cable and connector for a complete computer output, eliminating impedance matching problems.

BRIEF DESCRIPTION OF DRAWINGS

FIG. 1 is a schematic diagram illustrating the data and control lines between the computer and the peripheral in both data directions.

FIG. 2 is a block diagram illustrating the basic configuration of the fiber optic interconnect system for data flow in one direction.

DESCRIPTION OF THE PREFERRED EMBODIMENT

Figure 3:
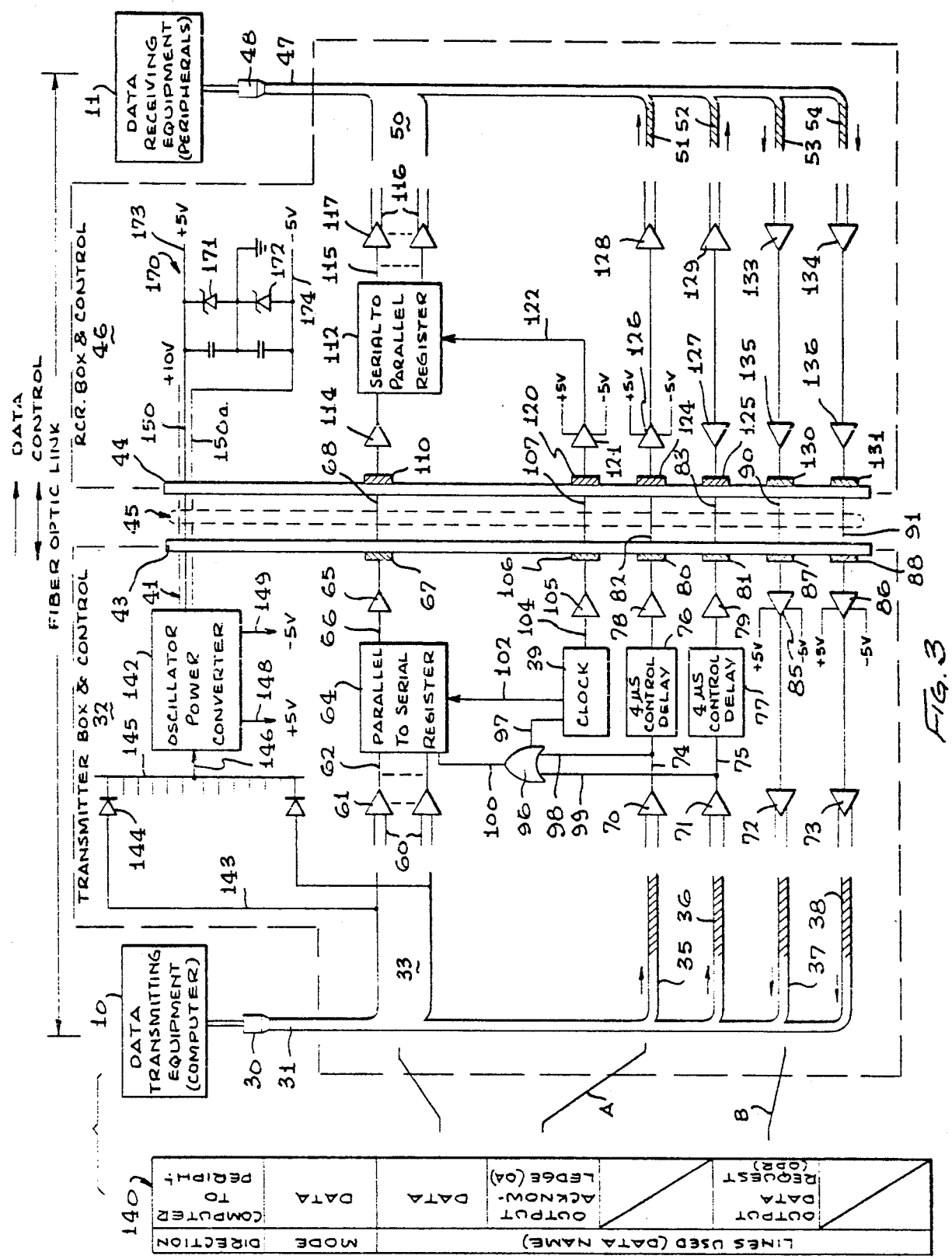
FIG. 3 is a schematic diagram of the fiber optic interconnect system of FIG. 2 for directing data from the computer to the peripheral and showing the links used in the data transmitting mode from the computer to the peripheral.

FIG. 1 illustrates schematically one embodiment of the interconnect system of this present invention. Data transmitting equipment, such as computer 10, is connected by fiber optic data line 14 to data receiving equipment, such as peripheral 11, and the data is transferred in the direction indicated by arrow 15. Output data request from the peripheral to the computer is over fiber optic link 16 and output acknowledgement to the peripheral is by fiber optic link 17. Data transmittal line 14 consists of a single fiber optic line which receives the data from thirty parallel outputs of the computer in serially multiplexed form. The control lines 18 and 19 are utilized for another mode of operations of the computer which is not necessary to explain in connection with the present invention. The data line 22 from the peripheral to the computer is also a single fiber optic link in which the data from the peripheral is multiplexed and the line can receive data from the equivalent of thirty peripheral output lines. Input data request is made from the peripheral to the computer over fiber optic line 23 and the input acknowledgement to the peripheral is over fiber optic line 24. The remaining fiber optic control lines 27 and 28 are utilized for another mode of operation of the computer. Since the fiber optic data lines 14 and 24 are not bi-directional, the light transmitter-receiver function must be oriented in keeping with information transmission direction.

FIG. 2 is a block diagram of that part of the interconnect system which provides for data transfer from the computer to the peripheral. The thirty bit parallel input data or command words are received from the computer by connector 30 and are transmitted by cable 31 to transmitter box and control unit 32. In unit 32, the thirty bit parallel information input in bundle 33 (see FIG. 3) is converted to serial form in a fiber optic line and four twisted pair control lines 35-38 are also connected with fiber optic lines as is the signal from clock 39. Also, unit 32 contains a power converter 40 which has an electrical power line 41 to the peripheral 11. Thus cable 45 (see FIG. 2) connected to unit 32 by connector 43, contains six fiber optic lines and one electrical power line. Connector 44 connects cable 45 with receiver box and control unit 46 where the control lines and the clock signal line are reconverted from optical to electrical signals on the peripheral side. The receiver unit 46 on the end of the fiber optic bundle also accepts the optical serial signal stream and translates the stream into a thirty bit parallel electrical output. Output cable 47 from unit 46 to the peripheral 11 contains thirty twisted pairs of electrical data lines and four electrical control lines and is connected with the peripheral by connector 48. The control signals in both directions are transmitted and received on separate individual optical lines and the control information is transmitted and received without any form of multiplex, although multiplex could be utilized for the control signals. The parallel output is contained in cable 47 by the thirty twisted pairs in bundle 50 and the control signals are contained in cable 47 by twisted pairs 51-54.

FIG. 3 is a schematic diagram of the interconnect system. Bundle 33 contains thirty twisted pairs of wires 60, each of which is connected with a line receiver 61 which transmits data in a single wire 62 to parallel to serial register 64. The serial output of register 64 is connected with drive amplifier 65 through a single output line 66 and amplifier 65 drives a light emitting diode 67 which converts the electrical pulses in line 66 to light pulses in fiber optic line 68 in a well known manner. The two twisted pairs of wires (lines 35 and 36) connect with line receivers 70 and 71, respectively, which transmit control signals through lines 74 and 75, respectively, to control delays 76 and 77, respectively. Drive amplifiers 78 and 79 are connected with control delays 76 and 77, respectively, and drive LEDs 80 and 81, respectively, which convert the electrical control signals in lines 35 and 36 into optical signals in fiber lines 82 and 83, respectively. Thus, lines 35 and 36 transfer control signals from the computer 10 to the peripheral 11 through optical fiber lines 82 and 83. The two lines 37 and 38 connect with line receivers 72 and 73, respectively, which are in turn connected to receiver amplifiers 85 and 86, respectively. Photo diodes 87 and 88 convert the control signals from the peripheral 11 in optical lines 90 and 91 into electrical signals to the computer through lines 37 and 38.

Clock 39 is connected to power switch 96 by line 97 and the switch is connected to control lines 74 and 75 by lines 98 and 99, respectively. Also, the power switch 96 is connected to parallel-to-serial register 64 by line 100. Clock 39 controls the register 64 through line 102. Also, control line 104 from clock 39 connects with drive amplifier 105 which drives LED 106 to impart clock signals to fiber optic line 107. The fiber optic lines 68, 82, 90, 91 and 107 are all contained in cable 45 which is illustrated schematically by the dashed loop line in FIG. 3. Connectors 43 and 44 are illustrated schematically at opposite sides of cable 45 and serve to connect the fiber optic cable 45 between units 32 and 46, which are also illustrated schematically by dashed line boxes in FIG. 3.

The fiber optic lines in cable 45 connect with conversion elements in unit 46. Line 68 drives photo diode 110 which connects with serial-to-parallel register 112 through receiver amplifier 114. In register 112, the serial information is assembled into a thirty bit parallel output in thirty lines 115, each of which connects with a twisted pair 116 through line driver 117. The thirty twisted pairs 116 are contained in bundle 50 which forms a part of cable 57. Fiber optic line 107 from clock 39 connects with photo diode 120 which converts the clock signal in line 107 to an electrical signal and this signal controls register 112 through receiver amplifier 121 and line 122.

Fiber optic lines 82 and 83 are used for transfer of control signals from the computer to the peripheral and these lines connect with photo diodes 124 and 125, respectively, which convert the optic signals to electrical signals. Photo diodes 124 and 125 are connected to twisted pairs 51 and 52, respectively, through receiver amplifiers 126 and 127, respectively, and line drivers 128 and 129 so that the control signals in twisted pairs 35 and 36 can be transferred from the computer to the peripheral. Light emitting diodes 130 and 131 are connected to optic lines 90 and 91, respectively, and to twisted pairs 53 and 54, respectively, through line receivers 133 and 134, respectively, and drive amplifiers 135 and 136, respectively. Thus, fiber optic lines 90 and 91 are used for transfer of control signals from the peripheral to the computer. The twisted pair lines 51, 52, 53, and 54 are also in cable 47 leading to the peripheral.

While the schematic of FIG. 3 is for transmitting data in only one direction from the computer to the peripherals by means of a fiber bundle, it is understood that a second fiber bundle can be used in a similar system with the components reversed to connect the peripherals to the computer for transmission of data, clock signals, and control signals in the reverse direction. The block 140 of FIG. 3 illustrates only the data mode of operation from the computer to the peripheral. The transmission is initiated by an output data request from the peripheral over fiber optic line 90 to twisted pair 37 (line B) leading to the computer and the output is acknowledged by transmission over twisted pair 35 (line A), and fiber optic cable 82 to twisted pair 51 in unit 46 leading to the peripheral. Thus, if the peripheral desires to receive data, it is requested over the twisted pair 37 and the output acknowledgement to the peripheral is over twisted pair 35. In this mode, twisted pairs 36 and 38 are not involved as they would be in another mode of operation.

As described, the fiber optic interconnect system uses light emitting diodes (LEDs) as the light source and pin photo diode detectors followed by amplifiers for conversion of information to the proper logic levels. The LEDs are driven by driver amplifiers and are compatible with the data rate and fiber optic bundle characteristics. In one example, the selected LEDs had emission near 900 nanometers and covers a 40 nanometer band. Also, the pin photo diodes had a peak spectral response near the 900 nanometer emission region of the LEDs. The line receivers and line drivers are also current amplifiers. Galileo fiber optic bundles were used for the transmission. These borosilicate-clad flint glass core bundles have a 0.001 square inch nominal transmission area made up of 2.5 mil fibers. The jacketed bundle diameter measures 0.088 inches and six of these bundles are used in each of the fiber optic cable 45. The interface control timing for the computer and the peripheral requires that delays of several microseconds (such as 4 μs) be interjected by units 76 and 77 in the optic control lines 82 and 83 in the direction of the parallel information flow from the computer to the peripheral link so that the data is entirely received prior to any control action. The power switch 96 is controlled by an output acknowledgement signal to turn on the clock 39 and register 64.

In order to have the fiber optic interconnect system completely interchangeable with an electrical interconnect, the fiber optic interconnect must not be dependent upon any external power source to operate its various components. The system is provided with a power converter unit 142 by which power is derived from the computer data lines so that the interconnect system requires no modification to the existing computer and peripheral equipment. The self-powered interconnect eliminates the need for external power wiring and makes possible a plug-in interchangeability between fiber optic and electrical cable links. The power converter receives signal levels from the computer data lines typically running between 3.5 and 4 volts positive and from this, both positive and negative voltages at about 5 volt level are produced with enough power to operate the registers, drive the LEDs, and power the detector diode circuits with associated amplifiers.

Referring to FIG. 3, each of the thirty twisted pairs 60 in bundle 33 is connected by a line 143 to a diode 144 which is in turn connected to a collector bus 145. Line 146 connects the collector with oscillator power converter unit 142 which produces +5 volts in output line 148 and −5 volts in output line 149. In addition, the converter produces a +10 volts in power line 41 comprised of conductor 150 and shield 150a leading to receiving control unit 46. The lines 148 and 149 energize both the photo diodes 87 and 88 and their receiver amplifiers 85 and 86 in transmitter unit 32. All other electrical components in the transmitter control unit 32 are connected solely to the +5 volts in line 148.

Figure 4:
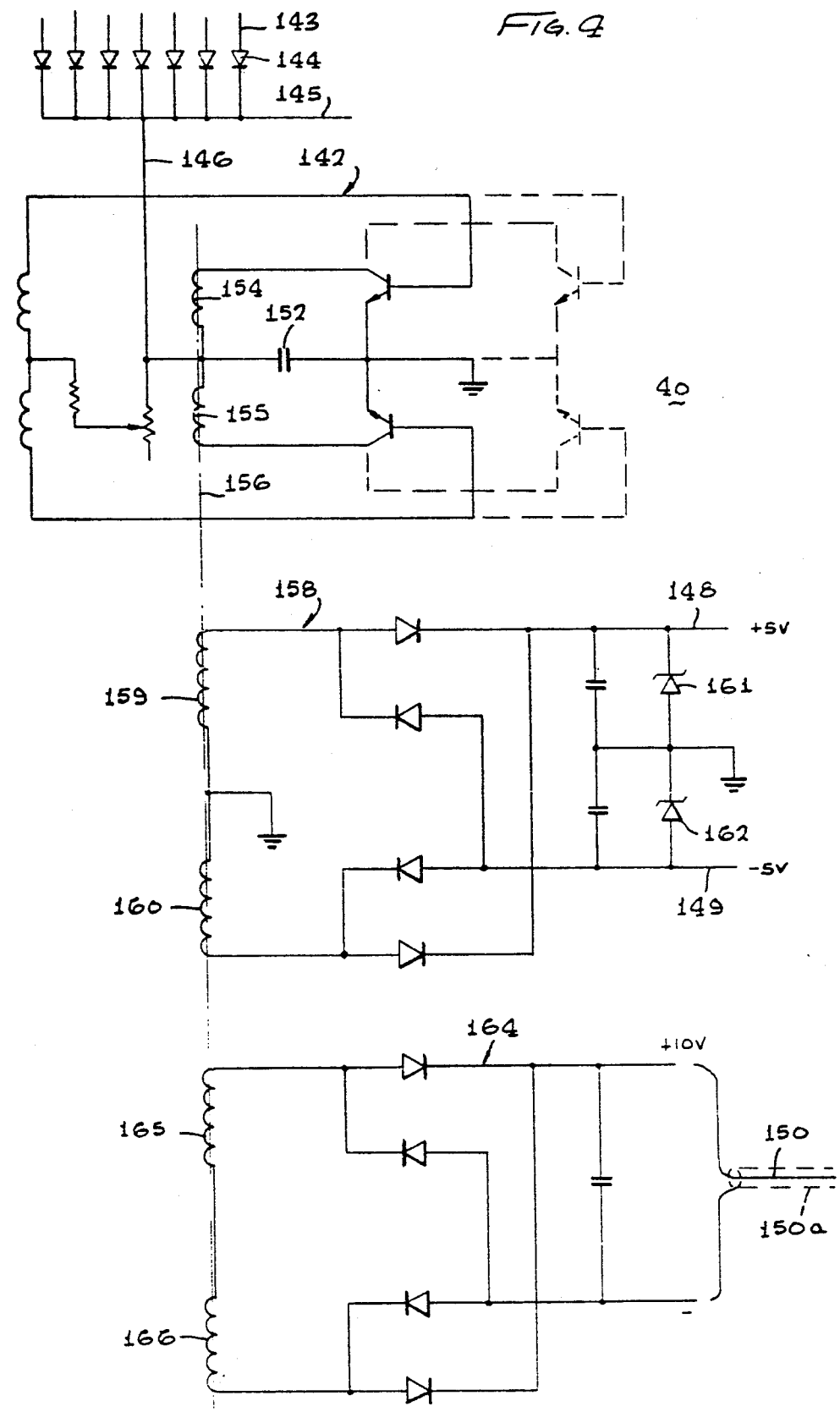
FIG. 4 is a schematic of the independent power source for the interconnect system.

FIG. 4 is a schematic illustrating diodes 144 connected to collector bus 145 which in turn is connected by line 146 to oscillator power converter unit 142. The collector bus 145 collects only the positive portion of the electrical signals from the computer 10 in the twisted pairs (line 60) and can collect one or more plus voltage signals from the diodes (e.g., 144). The collector bus is connected to capacitor 152 which stays charged by the diodes and provides a reservoir for driving the oscillator. The oscillator operates at a frequency of about 20 kilohertz and drives a pair of windings 154 and 155 which can have approximately twenty turns each wound around a core 156. As illustrated by the dashed lines, additional transistors for increased power output can be placed in parallel if sufficient current is available. A full-wave rectifier 158 has windings 159 and 160 of approximately forty turns each, also wound around the core 156. Zener diodes 161 and 162 with 5.1 clamp voltages comprise a voltage regulator connected to ground across the rectifier output to produce −5 volts in line 148 and a −5 volts in line 149. As illustrated in FIG. 3, the lines 148 and 149 drive the electrical components in transmitter control unit 32. A second full-wave rectifier 164 has transformer windings 165 and 166 of approximately forty turns wound about core 156 and the twenty kilohertz output of oscillator converter unit 142 is converted to a +10 volts between conductor 150 and shield 150a. All of the windings are wound on the common core 156 which is preferably fabricated of ferrite having the proper operating frequency range.

The shielded conductor 150 is also contained within cable 45 and connects with a voltage regulator 170 incorporated in the receiver control unit 46. Zener diodes 171 and 172 with 5.1 volts clamp voltage are connected across conductor 150 and shield 150a and produce +5 volts in line 173 and −5 volts in line 174. As in the case of the transmitter unit, the photo diodes and their associated amplifiers in the receiver control unit 46 are connected to both lines 173 and 174 and all of the remaining electronic components in the receiver unit 46 are connected only to the +5 voltage in line 173. The shielded power line 41 can be located at the center of the six fiber optic lines in cable 45. It is therefore apparent that the power converter 40 produces the necessary power for all the components in the transmitter control unit 32 and receiver control unit 46, without any external connections so that the fiber optic link is a quick replacement for an electrical link.

Figure 5:
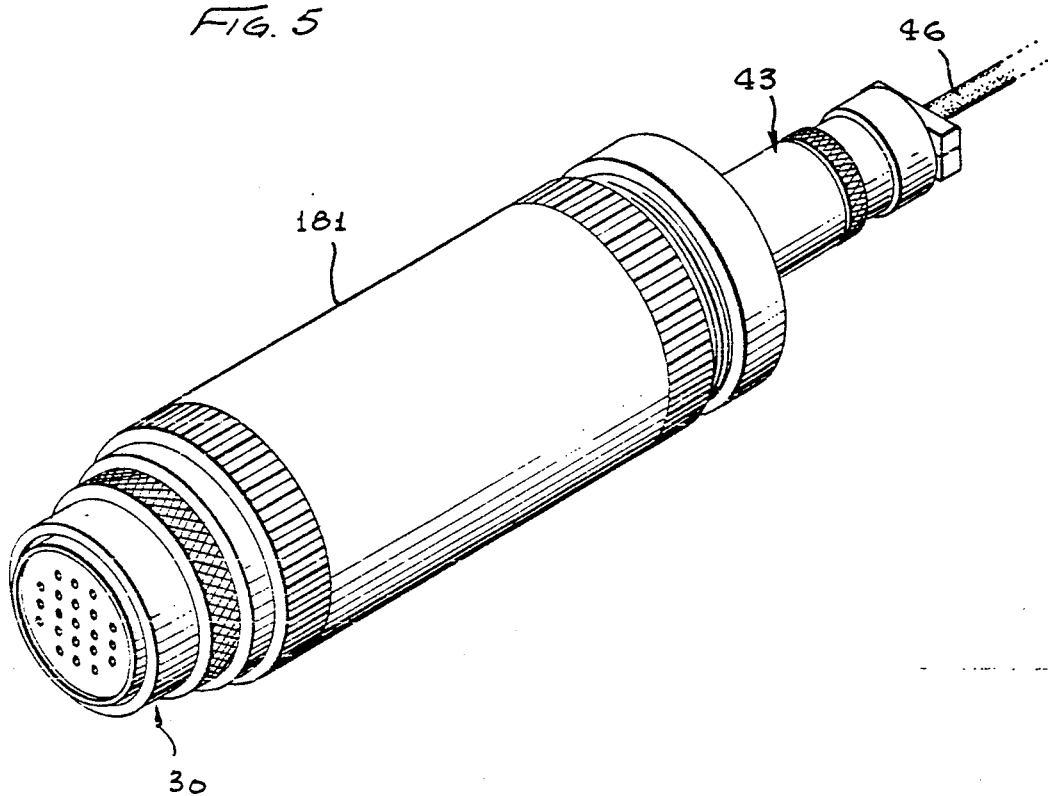
FIG. 5 is a perspective view of the connector backshell containing transmitter and power source for the system.
Figure 6:
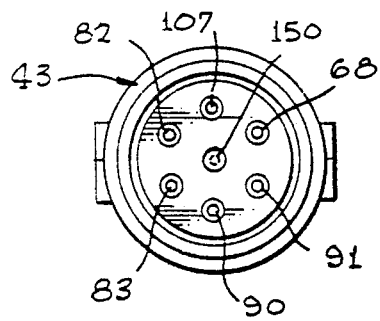
FIGS. 6 and 6A illustrate in elevation the connectors between the backshell and the fiber optic cable.
Figure 6A:
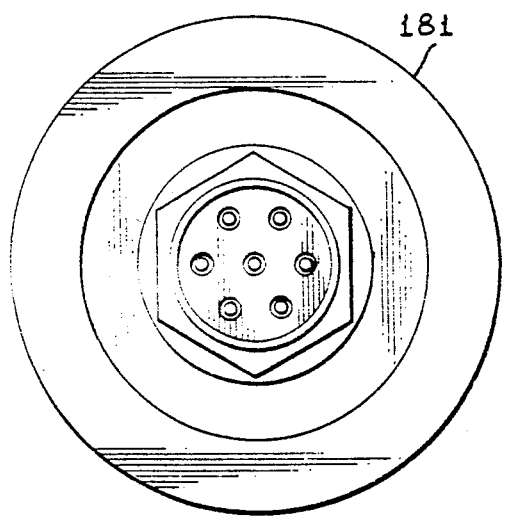

Referring to FIG. 5, the transmitter control unit 32 can be packaged in backshell 181 of an existing aircraft connector 30 and the connector 43 connects the fiber optic cable 45 to the six optic links and one electrical shielded line leaving the transmitter control unit 32. FIG. 6 illustrates the end of connector 43 which contains the six fiber optic lines and the shielded conductor 150 at the center. It is understood that connector 44 can connect to a backshell for connector 48 which is similar to backshell 181 so that all lines in cable 45 connect to receiver control unit 46. FIG. 6A illustrates the end of backshell 181 to which is attached connector 43.

The present invention provides an interconnect system which transmits information from one point to another, optically, the same as though a copper wire interconnect were used. In the case where multiple parallel data bits are to be transmitted, the fiber optic cable as a transmission medium is only a fraction of the weight and size of the existing parallel interface copper wire cables. The fiber optic interconnect system is self-contained and requires no modification to the existing computer or peripheral equipments since it incorporates its own power source. The present system also has advantages as an interconnect for computers which have electrical serial output. Sufficient power can be derived from a single electrical serial output line from the computer to convert the output to an optical serial output and to convert electrical control signals to optical signals for transfer in fiber optic lines to the receiver unit for the peripheral equipment. While the saving in weight is not as great, the use of the present system with a computer having serial electrical output still guards against shorts in the system and eliminates the performance difficulties due to electromagnetic cross-talk and interference while allowing closer physical spacing of information carrying fiber optic cables. Also, the increased electromagnetic security by the elimination of radio frequency emissions is also present. It is therefore apparent that the present invention has a wide field of application for interconnect systems in which a copper wire interconnect can be used and can be used in various type of information transfer systems, in addition to the interconnection between computers and peripheral equipment.

What is claimed is:

1. A self-powered fiber optic interconnect system for interconnecting a data transmitting device and a data receiving device comprising;
    means included in said data transmitting device for producing an electrical data signal;
    a transmitter converter comprising means for receiving and converting said electrical data signal to an optical data signal;
    a fiber optic line for receiving said optical signal at one end thereof for transmission therethrough;
    a receiver unit at the other end of said fiber optic line comprising means for receiving and reconverting said optical signal to an output electrical data signal; and,
    means for producing power from said electrical data signal in said data transmitter device for operating said transmitter converter and said receiver unit.

2. An interconnect system as defined in claim 1 wherein said power producing means comprises;
    means for producing voltage levels required by said transmitter converter;
    an electrical line for connecting a single voltage level from said power producing means to said receiver unit; and
    means in said receiver unit for converting said single voltage level to two different voltage levels for use by said receiver unit.

3. In an interconnect system as defined in claim 1 wherein said converting means comprises;
    a light emitting diode connected to said electrical data signal producing means for producing said optical signal in said fiber optic line;
    said receiver unit comprising a photo diode connected to said fiber optic line for reconverting said optical signal to said output electrical data signal;
    said light emitting diode and said photo diode being powered by said power producing means.

4. An interconnect system as defined in claim 1, said power producing means comprising;
    collector means connected to said electrical data signal producing means for providing a source of voltage;
    an oscillator operated by said voltage source;
    first and second full wave rectifiers connected with said oscillator for converting the output of said oscillator to first a positive dc voltage level; and
    first and second voltage regulators each producing from said second rectifier a second positive dc level and a negative dc level.

5. An interconnect system as defined in claim 4, said transmitter unit comprising both said full wave rectifiers and one of said regulators;
    said receiver unit comprising one of said regulators; and
    a cable for connecting one of said full wave rectifiers to said one regulator.

6. An interconnect system as defined in claim 1, said electrical data signal comprising a plurality of parallel data bits;
    said transmitter unit comprising means for converting said parallel bits to a serial signal;
    said fiber optic line being connected with said serial signal and transferring said serial signal to said receiver unit;
    said receiver unit comprising means for reconverting said optical signal to said parallel bits;
    said transmitter unit comprising clock means for producing an electrical clock signal controlling said converting means;
    means for converting said electrical clock signal to an optical signal;
    a fiber optic line for transferring said optical clock signal to said receiver unit; and
    said receiver unit comprising means for reconverting said optical clock signal to an electrical clock signal for controlling and reconverting means.

7. An interconnect system as defined in claim 1, said receiver unit and said transmitter unit each comprising means for receiving an electrical control signal;
   means for converting said electrical control signal received by one of said units to an optical signal;
   a fiber optic line receiving said optical control signal and transmitting said optical signal to the other unit;
   said other unit comprising means for reconverting said optical signal to said electrical control signal;
   said transmitter unit comprising clock means for producing an electrical clock signal controlling said converting means;
   means for converting said electrical clock signal to an optical signal;
   a fiber optic line for transferring said optical clock signal to said receiver unit;
   said receiver unit comprising means for reconverting said optical clock signal to an electrical clock signal for controlling said reconverting means;
   said power producing means comprising an electrical line for connecting a voltage from said power means to said receiver unit; and
   a single cable containing said electrical line and said fiber optic lines for said optical data signal, said optical control signal, and said optical clock signal.

8. An interconnect system as defined in claim 1, said power producing means operating said converting means and reconverting means for each of said data signal, control signal, and clock signal.

* * * * *